(12) United States Patent
Olof-Ors et al.

(10) Patent No.: US 8,949,241 B2
(45) Date of Patent: Feb. 3, 2015

(54) SYSTEMS AND METHODS FOR INTERACTIVE DISAMBIGUATION OF DATA

(75) Inventors: Mans Anders Olof-Ors, Luzern (CH); Doron T. Houminer, Harutzim (IL)

(73) Assignee: Thomson Reuters Global Resources, Baar (CH)

( * ) Notice: Subject to any disclaimer, the term of this patent is extended or adjusted under 35 U.S.C. 154(b) by 463 days.

(21) Appl. No.: 12/453,397

(22) Filed: May 8, 2009

(65) Prior Publication Data

US 2010/0287210 A1 Nov. 11, 2010

(51) Int. Cl.
G06F 17/30 (2006.01)
G06F 17/27 (2006.01)

(52) U.S. Cl.
CPC .................................. *G06F 17/278* (2013.01)
USPC ......................................................... 707/739

(58) Field of Classification Search
CPC .................................................. G06F 17/2785
USPC ........................................ 707/749, 755, 739
See application file for complete search history.

(56) References Cited

U.S. PATENT DOCUMENTS

| | | | |
|---|---|---|---|
| 5,163,131 A | 11/1992 | Row et al. | |
| 5,862,325 A | 1/1999 | Reed et al. | |
| 6,405,162 B1 | 6/2002 | Segond et al. | |
| 6,769,018 B2 | 7/2004 | Gagnon | |
| 7,003,522 B1 | 2/2006 | Reynar et al. | |
| 7,032,174 B2 | 4/2006 | Montero et al. | |
| 7,124,354 B1 | 10/2006 | Ramani et al. | |
| 7,146,383 B2 | 12/2006 | Martin et al. | |
| 7,305,415 B2 | 12/2007 | Vernau et al. | |
| 7,398,324 B2 | 7/2008 | Brennan et al. | |
| 7,433,876 B2 | 10/2008 | Spivack et al. | |
| 7,853,478 B2 | 12/2010 | Donahue et al. | |
| 2002/0108115 A1 | 8/2002 | Palmer | |
| 2003/0135826 A1 | 7/2003 | Dozier | |
| 2004/0117173 A1* | 6/2004 | Ford et al. | ............... 704/9 |
| 2005/0182798 A1* | 8/2005 | Todd et al. | ............. 707/200 |
| 2005/0235031 A1 | 10/2005 | Schneider et al. | |
| 2005/0262428 A1 | 11/2005 | Little et al. | |
| 2006/0036461 A1 | 2/2006 | Chuah et al. | |
| 2006/0242489 A1 | 10/2006 | Brockway et al. | |
| 2006/0259781 A1 | 11/2006 | Saeki et al. | |

(Continued)

OTHER PUBLICATIONS

"Best Practices for Structural Metadata," Version 1, Yale University Library, Jun. 1, 2008.

(Continued)

*Primary Examiner* — Alexey Shmatov
(74) *Attorney, Agent, or Firm* — Covington & Burling LLP

(57) ABSTRACT

Systems, methods and computer program products residing on a computer readable medium for use in and capable of storing computer instructions therein for enabling a computer to perform a computer-implemented and user assisted process for disambiguating entities in an electronic document that includes: (a) creating, by the user, an electronic document; (b) providing, by the computer, a list to the user of potential entities related to an entity provided by the user in the electronic document; and (c) selecting, by the user, an entity provided in the computer provided list.

16 Claims, 12 Drawing Sheets

(56) References Cited

U.S. PATENT DOCUMENTS

| | | |
|---|---|---|
| 2007/0118803 A1 | 5/2007 | Walker et al. |
| 2008/0021895 A1 | 1/2008 | Stevenson et al. |
| 2008/0028286 A1* | 1/2008 | Chick .......................... 715/208 |
| 2008/0127289 A1 | 5/2008 | Julia et al. |
| 2008/0275859 A1 | 11/2008 | Griffith |
| 2008/0300984 A1 | 12/2008 | Li |
| 2008/0306913 A1* | 12/2008 | Newman et al. .................. 707/3 |
| 2009/0055405 A1 | 2/2009 | Brier et al. |

OTHER PUBLICATIONS

International Search Report from corresponding Application No. PCT/US2009/05118 (Oct. 30, 2009).

Written Opinion of the International Searching Authority from corresponding Application No. PCT/US2009/05118 (Oct. 30, 2009).

Non-Final Office Action issued on Jan. 19, 2011 in U.S. Appl. No. 12/232,312, filed Sep. 15, 2008.

International Search Report from corresponding Application No. PCT/US2010/001368 (Jun. 24, 2010).

* cited by examiner

| 302 | 316 | 318 | 320 | 322 | 324 |
|---|---|---|---|---|---|
| UNIQUE ID | CITYNAME | STATE | COUNTRY | LATITUDE | LONGITUDE |
| UI994ec1bf | NEW YORK | NEW YORK | UNITED STATES | 40.7142 | -74.0064 |
| 326 | 110 | 352 | 354 | 356 | 358 |

| UNIQUE ID 302 | COMPANY 306 | PUBLISHER AND CHAIRMAN 602 | MANAGING EDITOR 604 | MANAGEMENT 606 | RECENT EVENTS 608 |
|---|---|---|---|---|---|
| U4 — 610 | MINNEAPOLIS STAR TRIBUNE — 402a | CHRIS HARTE; http://startribunecompany.com/15 — 0 (612) | RENE SANCHEZ; — 502a<br>http://www.startribunecompany.com/148 — 502i | NANCY BARNES, EDITOR AND SENIOR VICE PRESIDENT, — 502b<br><br>DAVE MONTGOMERY, CHIEF FINANCIAL OFFICER; — 502c<br><br>RANDY LEBEDOFF, SENIOR VICE PRESIDENT AND GENERAL COUNSEL; — 502d<br><br>DAN SHORTER, PRESIDENT, DIGITAL MEDIA. — 502e<br><br>http://startribunecompany.com/107 — 502f | ON JANUARY 15, 2009, THE STAR TRIBUNE COMPANY FILED A VOLUNTARY PETITION TO REORGANIZE UNDER CHAPTER 11 OF THE U.S. BANKRUPTCY CODE IN THE U.S. BANKRUPTCY COURT FOR THE SOUTHERN DISTRICT OF NEW YORK, — 502g<br><br>http://www.startribunecompany.com/company/reorganization.php; — 502h |

FIG. 6A

```xml
<?xml version="1.0" encoding="UTF-8" ?>
=<XML>
 =<Content Format="DISAMBIGUATED">
  =<DOCUMENT>
   <ID>1697306992-1518189843960</ID>
   <TYPE>Daily News - Press Releases</TYPE>
   <SOURCE>Reuters Business News</SOURCE>
   <Title>Minneapolis Star Tribune in bankruptcy filing</Title>
   <DATE>Monday January 26, 2009</DATE>
   <BODY>NEW YORK (Reuters)-The Minneapolis Star Tribune has filed for bankruptcy, becoming the latest newspaper to financially flame out under a heavy debt load and a punishing decline in advertising revenue. "With the significant deterioration in our revenue in 2008 and the challenging outlook for our industry for 2009, we simply could not wait any longer to take this step," said Chris Harte</BODY>
  </DOCUMENT>
 </Content>
 =<DisambiguationResults>
  =<item type="Person">
   <uid>UI1</uid>
   <exact>Chris Harte</exact>
   =<disambiguation>
    <Surname>Hart</Surname>
    <GivenName>Chris</GivenName>
    <Company>Minneapolis Star Tribune</Company>
    <Position>Chairman</Position>
    <Nationality>US</Nationality>
    <Gender>Male</Gender>
    <Affiliation>Avista Capital Partners</Affiliation>
    <Education>Stanford University</Education>
   </disambiguation>
```

FIG. 7A

```
</item>
=<item type="City">             ⟵726
  <uid>UI12994ec1bf</uid>
  <exact>NEW YORK</exact>
=<disambiguation>
  <CityName>New York</CityName>
  <State>New York</State>
  <Country>United States</Country>
  <Latitude>40.7142</Latitude>
  <Longitude>-74.0064</Longitude>
  </disambiguation>
  </item>
=<item type="Company">          ⟵728
  <uid>UI4</uid>
  <exact>Minneapolis Star Tribune</exact>
=<disambiguation>
  <CompanyName>McClatchy Newspapers Inc</CompanyName>   ⟵734
  <Ticker>MNI</Ticker>
  <CIK>1056087</CIK>            ⟵732b
  <SIC>Newspapers (2711)</SIC>
  <Address>2100 "Q" Street, Sacramento, CA, 95816, United States</Address>  ⟵730b
  <HomePage>http://www.mcclatchy.com</HomePage>
  </disambiguation>
  </item>
  </DisambiguationResults>
</XML >
```
732a ⟶ (CIK line)
730a ⟶ (Address line)

FIG. 7B

SYSTEMS AND METHODS FOR INTERACTIVE DISAMBIGUATION OF DATA

FIELD OF EMBODIMENTS OF THE INVENTION

Embodiments of the present invention generally relate to disambiguating entities in an electronic document and, more particularly, to providing to a user a list of disambiguated entities that may be related to an entity provided or generated by the user in the electronic document, and enabling the user to select one of the disambiguated entities.

BACKGROUND OF EMBODIMENTS OF THE INVENTION

The advent of the semantic web promises a world where documents are interchangeable, such that regardless of where the documents are written they can be correctly interpreted by an automated process. This requires unique, permanent and shared entity identifiers, or uniform resource identifiers (URIs), and high quality disambiguation. A URI is generally a string of characters used to identify or name a resource on the Internet. A resource can refer to a document, file, or virtually anything (e.g., person, place, thing, etc.) that can be identified, named, addressed or handled in the World Wide Web (WWW), or in a networked information system. Such identification enables interaction with representations of the resource over a network, typically the WWW, using specific protocols. URIs are generally defined in schemes specifying a specific syntax and associated protocols.

Current text analytic tools, such as Open Calais by Thomson Reuters (www.opencalais.com), can with some degree of confidence indicate, for example, that "Mike Smith" is a name. Current text analytic tools can also, to some extent, make assumptions from the context of the text and propose other properties of "Mike Smith" (such as address, occupation, etc.). Current text analytic tools can also make similar assumptions and propose other properties about other entities, such as companies, and location entities such as cities, states and countries.

However, one shortcoming of known text analytic tools is that they cannot by themselves confirm the true identity of "Mike Smith." Moreover, current text analytic tools do not allow the user to be involved in or participate in the selection of the "Mike Smith" entity that is intended by the user. That is, if there are a plurality of "Mike Smith" entities stored in a database utilized by the text analytic tool, the text analytic tool cannot be entirely sure that it is selecting the correct "Mike Smith" (i.e., the "Mike Smith" intended by the author of the document). Embodiments of the present invention are directed to overcome these, and other known limitations associated with text editing tools.

SUMMARY OF EMBODIMENTS OF THE INVENTION

Aspects and embodiments of the present invention are directed to enabling an end user to identify and select, from a list of entities presented to the user, the entity, and metadata associated therewith, that the user intends to include in a document.

Aspects and embodiments of the present invention are also directed to enabling an end user to identify and confirm that the correct metadata is associated with selected entities in electronic documents, in a manner that overcomes certain limitations associated with known systems and methods.

Aspects and embodiments of the present invention are also directed to enabling an end user to add metadata, delete metadata and/or edit metadata associated with entities selected by a user for use in an electronic document, in a manner that overcomes certain limitations associated with known systems and methods.

Confirmation that the correct metadata is associated with selected entities in an electronic document can be performed by the user in a document "creation mode" in the same or similar manner, for example, as a spell and grammar check is carried out while the document is being written. In an alternate embodiment, confirmation that the correct metadata is associated with selected entities in electronic documents can be performed subsequent to or near completion of the document, and/or before or after publication. Although exemplary uses in connection with various embodiments of the present invention are illustrated in the context of the creation of a document, it should be understood that embodiments of the present invention can be applied on or to any unstructured content, during the course of creating and/or subsequent to the creation of such unstructured content.

More particularly, in one or more embodiments of the present invention, a computer program product residing on a computer readable medium storing computer instructions is provided for enabling a computer to perform a computer-implemented and user assisted process for disambiguating entities in an electronic document. The computer program product includes instructions for enabling a computer to: (a) create, by the user, an electronic document; (b) provide, by the computer, a list to the user of potential entities related to an entity provided by the user in the electronic document; and (c) select, by the user, an entity provided in the computer provided list.

The computer program product may also include instructions for storing the list of entities in a data repository and/or incorporating metadata associated with the user selected entity into the electronic document. The list may include, for example, at least one person, at least one geographic location and/or at least one commercial enterprise.

The instructions may also allow a user to add a new entity to a data repository, as well as add to the data repository additional data associated with a particular entity. The instructions may also allow a unique identifier to be assigned to each entity, and store the unique identifier in the data repository. Finally, the computer program product may also include logic to provide the list of potential entities to the user, optionally by taking into account entities contained in other electronic documents created by the user.

In another embodiment of the present invention, a computer includes a memory and a program resident in the memory that is configured to facilitate disambiguation of entities within a user-created electronic document. Entities in the document can be disambiguated by presenting to a user a list of entities related to an entity provided by the user in the electronic document, and enabling the user to select one of the disambiguated entities.

The program is configured to incorporate metadata pertaining to the user selected entity into the electronic document, and can accept as an input from a user a selection of one of the entities presented to the user. The program can also associate metadata from the user selected entity with the entity provided by the user in the electronic document, as well as incorporate metadata associated with the user selected entity into the electronic document.

In yet another embodiment of the present invention, a system for facilitating the disambiguation of entities in an electronic document is provided that includes one or more input devices, one or more output devices, and a computer. The computer includes a memory and/or a storage medium for storing a program that facilitates the disambiguation of entities in the electronic document. The program receives data from the at least one input device, provides to the at least one output device a list of entities related to or potentially related to an entity provided via the at least one input device, and receives via the at least one input device a selection, by a user, of one of the entities from the list of entities.

The metadata can pertaining to the selected entity is stored in a data repository or the selected entity is stored in the electronic document. The program can provide provides the list of entities to the user by taking into account entities contained in other electronic documents created by the user.

BRIEF DESCRIPTION OF THE DRAWINGS

FIGS. 3A and 3B are exemplary illustrations of structures and/or organization of an entity database, or portion thereof.

FIGS. 6A and 6B are second exemplary illustrations of structures and/or organization of an entity database, or portion thereof.

FIGS. 7A and 7B, taken together, is exemplary eXtensible Markup Language (XML) code associated with the text shown in FIG. 1.

DESCRIPTION OF EMBODIMENTS OF THE INVENTION

Figure 1:
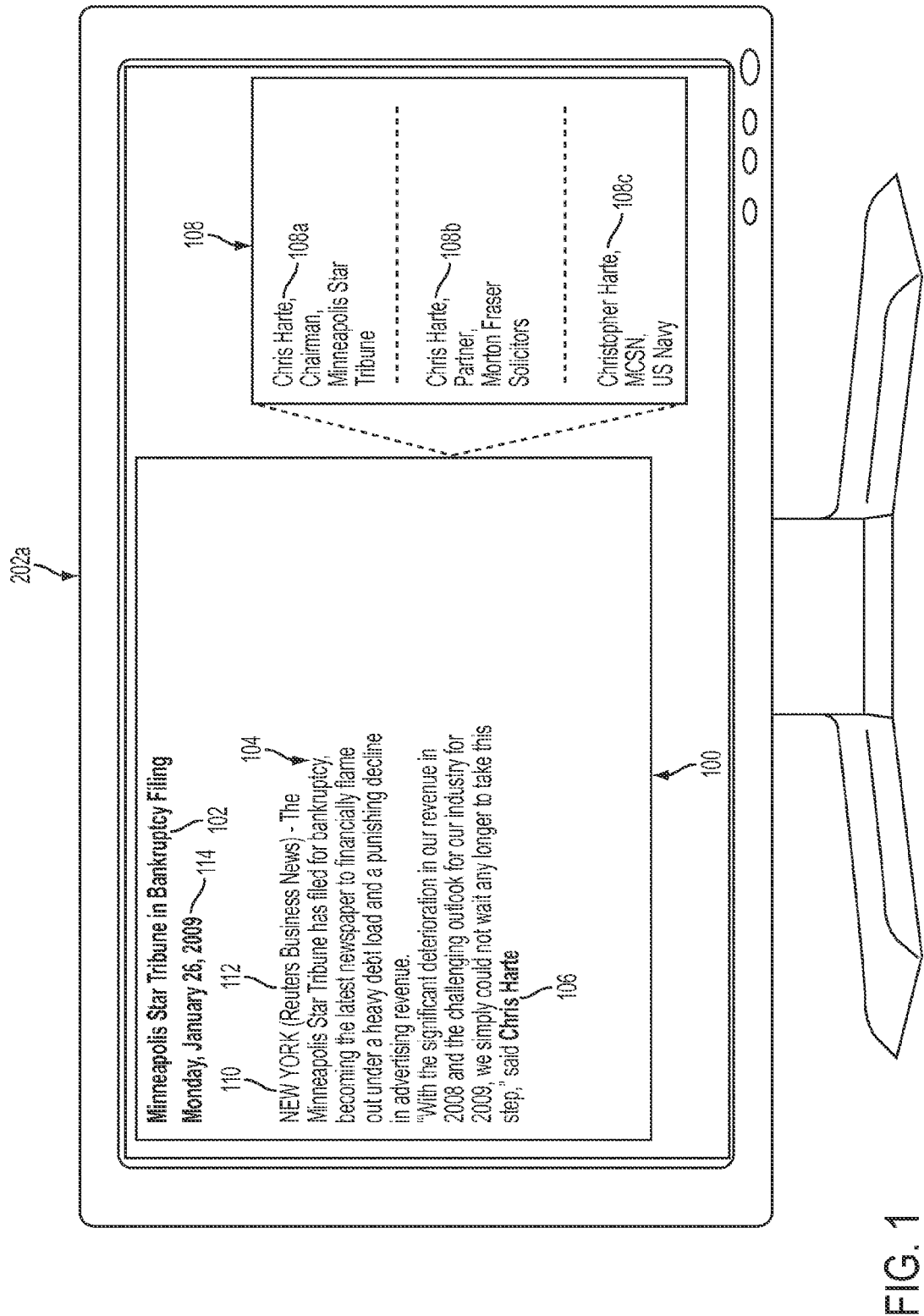
FIG. 1 is an exemplary document that can be used to illustrate aspects of an example of document text that can be processed and disambiguated by an end user in accordance with various embodiments of the present invention.

FIG. 1, generally at 100, is an exemplary document that can be used to illustrate aspects of an example of document text 104 that can be processed and disambiguated by an end user in accordance with various embodiments of the present invention. As used herein, to disambiguate means to remove ambiguities from something in order to establish a unique or uniform semantic interpretation of something. For example, the word "Pluto" can refer to several different things, including: i) a cartoon character created by Walt Disney; ii) the god of the underworld in ancient mythology; or iii) a small planet and the farthest known planet from the sun. Embodiments of the present invention present to a user who is typing (or otherwise editing and/or creating) an electronic document a list of potential entities (e.g., cartoon character, god of the underworld, or small planet) when an ambiguous term is encountered.

In operation, an end user types content in an editing tool, such as standard word processing software or a text editor. For example, Microsoft Word (any version), or the WordPad text editor that is included with almost all versions of Microsoft Windows operating system from Windows 95 and upwards, can be used. In FIG. 1, the content is the text 104 associated with and title of the Minneapolis Star Tribune in Bankruptcy Filing 102 news story.

An entity extractor (as will be explained herein) searches for names and other entities, typically as a user types and enters text. Generally, entities can include people, companies, organizations, places/geographic locations, events, books, albums, authors, and the like. As shown in FIG. 1, the extractor will detect names, such as Chris Harte 106. The name—Chris Harte 106 in this instance—is provided to a disambiguation service. An example of a software package that combines the functionality of entity extraction and disambiguation is the Open Calais Service by Thomson Reuters (http://viewer.opencalais.com).

As shown in FIG. 1, when the entity extraction software detects an entity, such as Chris Harte 106, the names of potential entity candidates corresponding to Christ Harte 106 are returned to and displayed for the end user to view. As shown in FIG. 1, menu 108 displays to the end user data associated with entities 108a-c. More particularly, Chris Harte, Chairman, Minneapolis Star Tribune 108a, Chris Harte, Partner, Morton Fraser Solicitors 108b, and Christopher Harte, MCSN, US Navy 108c are returned. The ranking or ordering of the names presented can be improved, for example, by taking other entities in the text 104 into account. In addition, previous articles and/or other text entered by the author can also be considered and utilized in presenting the ranking or ordering of the names presented to the end user. The author can then select one of the instances of the names presented 108a, 108b, 108c. In FIG. 1, the user would select Chris Harte, Chairman, Minneapolis Star Tribune 108a, insofar as the title 102 and text 104 of the news article pertain to the Minneapolis Star Tribune.

Once the user selects Chris Harte, Chairman, Minneapolis Star Tribune 108a, a unique person identifier (ID) will be associated with and stored as an additional metadata item in document 100 in connection with the entity/individual Chris Harte, Chairman, Minneapolis Star Tribune 108a. More particularly, as shown in FIG. 3, which is an exemplary illustration of a structure and/or organization of an entity database 300, under UniqueID field 302, entity 108a will have Unique ID UI1 associated with it, as shown at 302a.

As also shown in FIG. 1, while writing a document 100, such as a news story, a journalist (or other end user) will be presented with entity options 108a-c. This will allow the journalist to disambiguate entities within document 100 (including any entities within the document, such as title 102, date 114, city 110, news source 112 and/or text 104). For example when an end user, such as a journalist types or otherwise enters "Chris Harte" into an authoring tool, the application will provide instances 108a-c of this name. The list of returned entities 108a-c that can be selected by the end user can be created based, for example, on a ranking system that can utilize criteria such as the document text 104 itself, previously disambiguated entities within the current document 100, previously disambiguated entities that the current author has disambiguated in previous documents, saved author/user preferences, the overall document corpus, time based probabilistic ranking, and the like.

In FIG. 1, the author/end user would, as noted above, select entity 108a, as Chris Harte, Chairman, Minneapolis Star Tribute corresponds to the title 102 of the story: Minneapolis Star Tribute in Bankruptcy Filing. In this manner, the author would confirm the actual identity of the person (Chris Harte) referenced in the news article (or whatever document 100 is being written), as intended by the author.

During the course of preparing a document 100, in the event that the author is unsure of which instance of a presented entity (e.g., entities 108a-c) is the correct one, the system will allow for and provide retrieval of all information stored for each entity 108a-c to help facilitate the author's selection of the correct entity. For example, referring again to FIG. 3, menu 108 may also display for each entity 108a-c data pertaining to Gender 304, Education 310 and/or Nationality 314.

In one embodiment of the present invention, as will be explained further herein, the author (or other suitable entity/subject matter domain expert) can elect to disambiguate entities after the final version of the document 100 has been created and/or published. After the user has created the document, the system can then, for example, analyze the text 104 within and title 102 of the document 100, and propose a list of entities (similar to those shown in menu 108) to the user for each entity that with the document. In this manner, the system does not interactively prompt the user for each applicable entity in the document 100 as s/he is typing in the text 104 of the document during the course of creating the document 100. Once the user selects the appropriate entity (e.g., 108a) for each entity (e.g., 106) identified within document 100, the metadata associated with each user-selected entity will then, in accordance with one embodiment of the present invention, be stored as part of the document 100, in an entity database 300 such as shown in FIG. 3. Embodiments of the present invention thus advantageously provide improved metadata accuracy, by enabling the author of a document 100 to determine and specify with absolute confidence which entities (and associated metadata) it contains.

Figure 2:
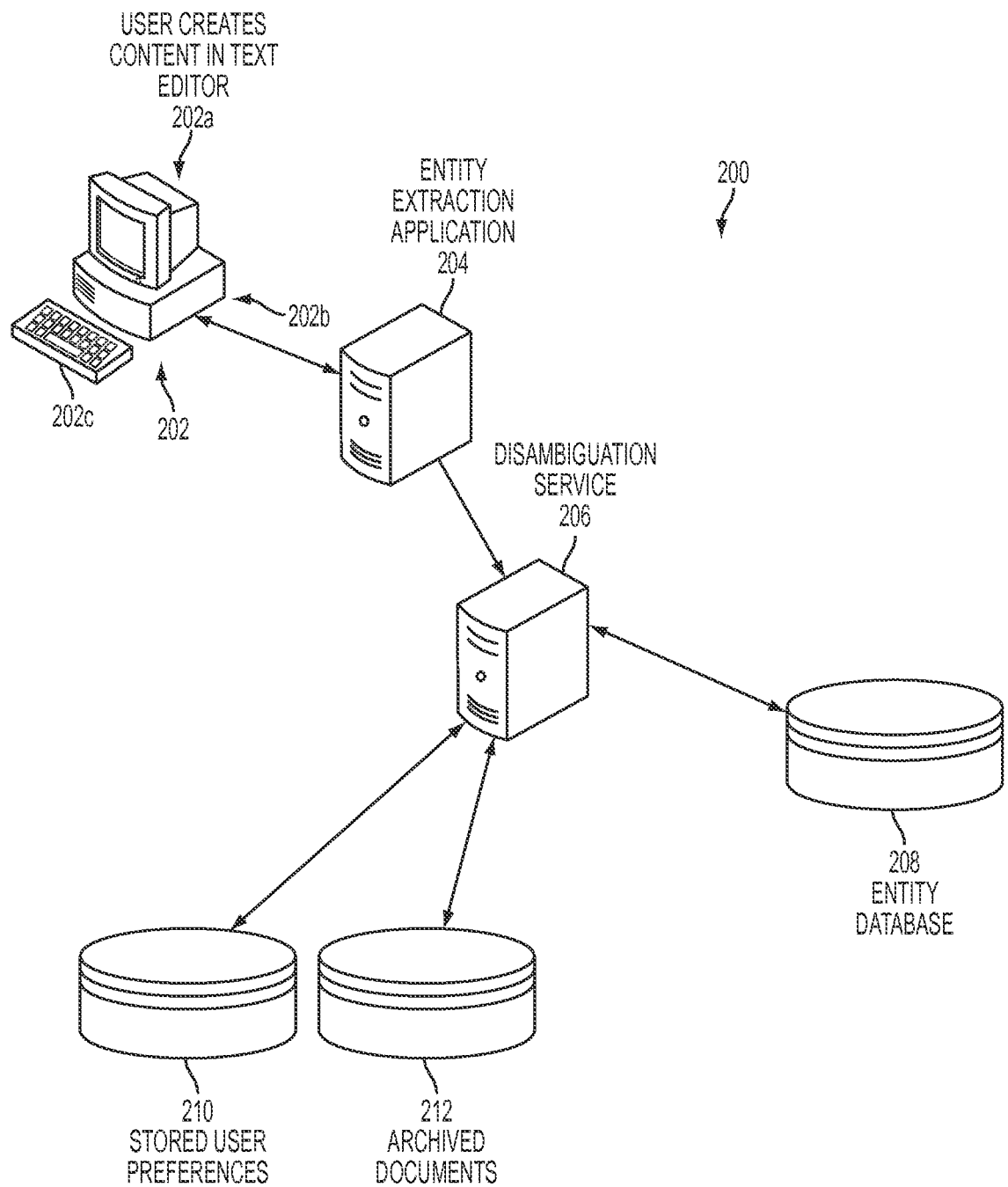
FIG. 2 is an exemplary system diagram that also serves as a flow diagram, illustrating aspects of data flow, storage and retrieval that can be utilized in connection with disambiguating document text in accordance with various embodiments of the present invention.
Figure 9:
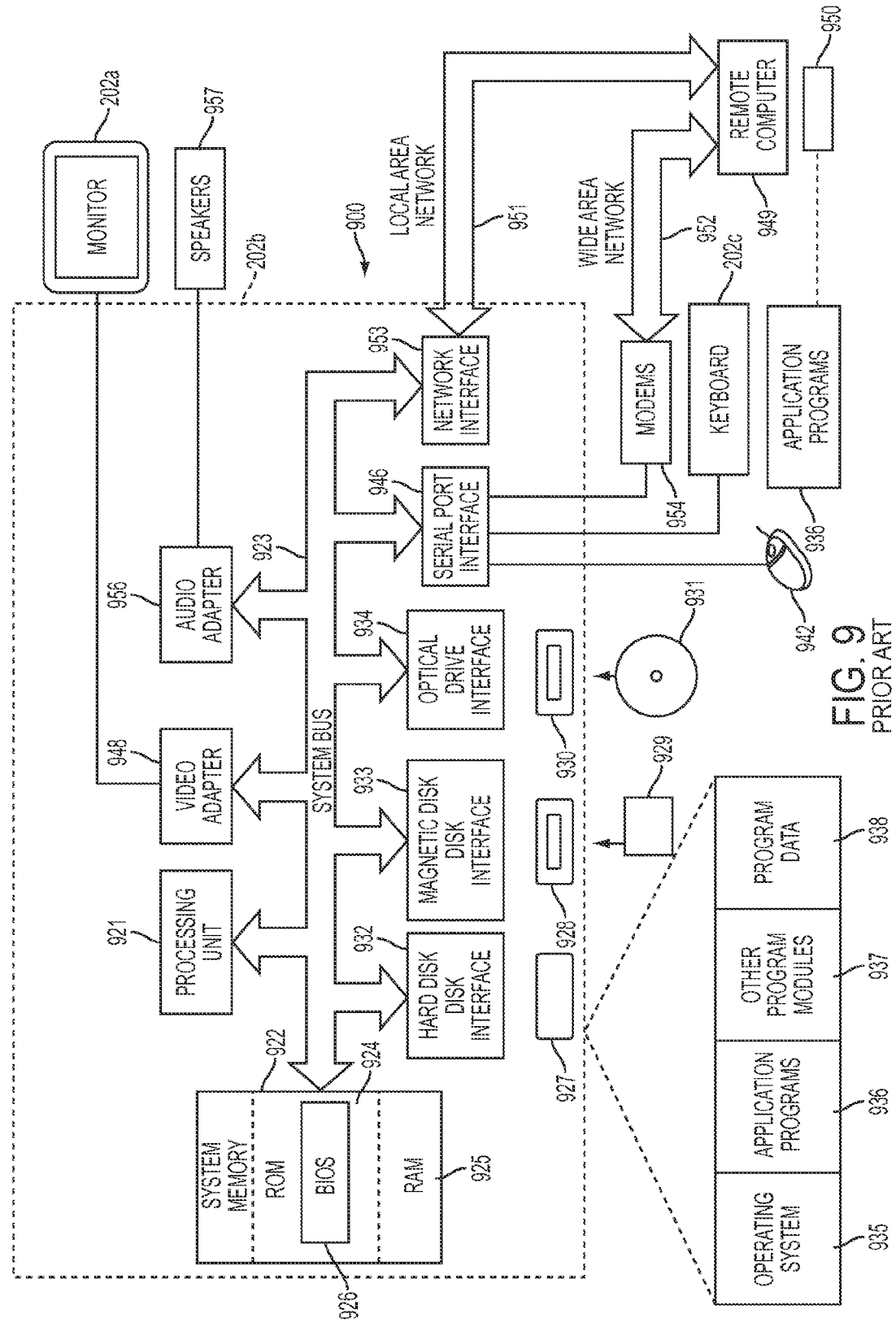
FIG. 9 is an illustrative embodiment of a standard computer architecture and assorted peripherals, and exemplary network configurations that may be used consistent with embodiments of the present invention.

FIG. 2, generally at 200, is an exemplary system diagram that also serves as a flow diagram, illustrating aspects of data flow, storage, and retrieval that can be performed by various embodiments of the present invention. A general purpose computer 202 is used by the user (not shown) to enter the title 102, date 114, city (or other location) 110, news source 112 and/or text 104, for example, of a news story or article (or other document 100) as shown in FIG. 1. As shown in FIG. 2, computer 202 includes a display monitor 202a, a computing device in the form of a conventional general purpose computing device 202b, and a keyboard 202c. A general purpose computer 202b, display monitor 202a, and keyboard 202c that can be used in connection with embodiments of the present invention is shown in FIG. 9.

During the time that the user is typing, for example, the title 102, text 104 and/or other information into document 100 using keyboard 202c, the text is passed to an entity extraction software application (such as the Open Calais Web Service by Thomson Reuters) that detects entities 106. In operation, the entity extraction software application will automatically create semantic metadata for the document 100, by identifying entities (such as entity 106) within the document 100. The entity extraction software application will typically be software executing on a second computer 204, which can also be a general purpose computer (such as shown in FIG. 9). However, the entity extraction software application can also reside on be executed on computer 202 that the user is using to type text 104.

Upon identification of entities 106 within document 100, the extracted entities are passed to a disambiguation service. As noted above, in the case of the Open Calais Web Service, the entity extraction functionality and disambiguation service functionality are both provided in an integrated software package that can reside on a single computing device, such as computer 204 or 206 (or 202). However, various embodiments of the present invention can also utilize separate, dedicated software packages respectively corresponding to each of the entity extraction and disambiguation services, that respectively reside and operate on computers 204 and 206.

Figure 3A:
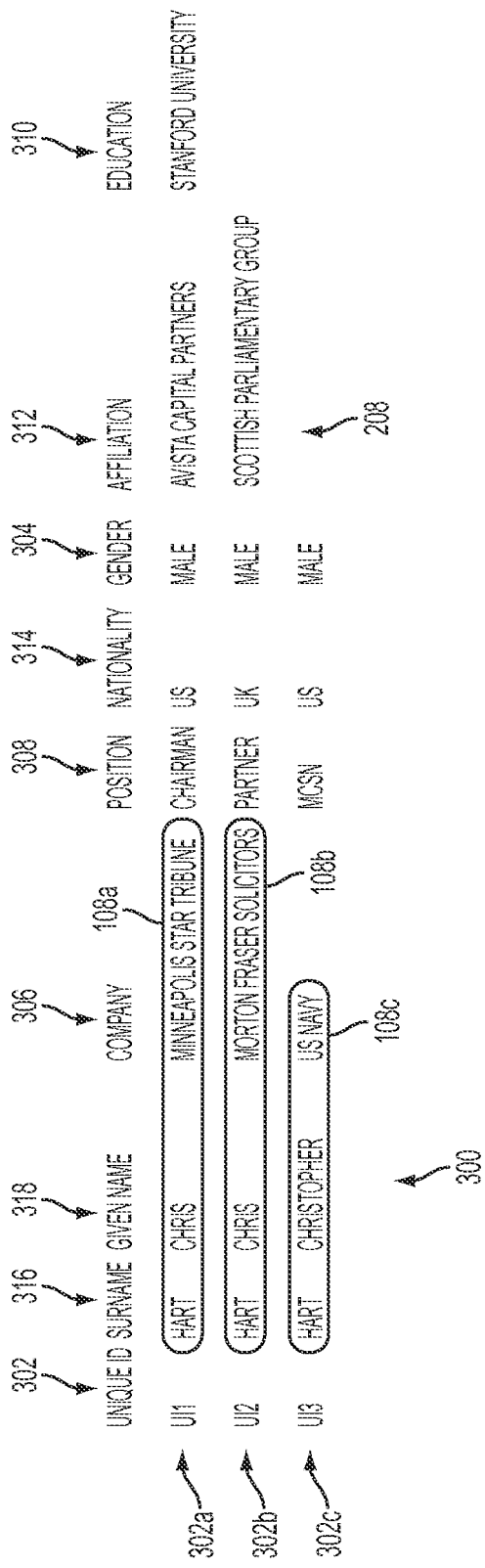

FIG. 3A, generally at 300, shows an exemplary illustrations of a structures and/or organization of an entity database, or portion thereof. As shown, FIG. 3A includes entities 108a-c. However, it should be understood that entity database 208 will generally contains large numbers of entities 106 (e.g., typically in the millions, tens of millions, or even more). Each entity 106 will have a unique and permanent identifier, as exemplified by the UniqueID field 302. For example, entity 108a has Unique ID UI1 associated with it, as shown at 302a, and entity 108b has Unique ID UI2 associated with it, as shown at 302b. Similarly, entity 108c has Unique ID UI3 associated with it, as shown at 302c.

Each entity 108a-c will also have a number of properties, some of them permanent and some transient. For example, entities 108a-c may have Gender 304 and Education 310 as permanent properties, while Company 306, Position 308, Affiliation 312 will be transient. Generally, entity database 208 will enable or facilitate identification of entities 106 that have been disambiguated by individual users, as well as a more comprehensive database that contains entities 106 that have been disambiguated by all users. To accomplish this, an entity database can include a field (not shown) pertaining to a particular user that has disambiguated a particular entity (e.g., entity 108a, 108b and/or 108c).

Returning now to FIG. 2, archived document database 212 will contain a list of all documents 100 that have been generated and stored by, for example, the authors' organization (e.g., Thomson Reuters, New York, N.Y.). In addition, document database 212 could also include document from two or more organizations (e.g., Thomson Reuters, New York, N.Y. and Associated Press, New York, N.Y.). In turn, entity database 208 could include and be populated with entities found in documents from two or more organizations (e.g., Thomson Reuters, New York, N.Y. and Associated Press, New York, N.Y.). With respect to FIG. 1, the contents of archived documents database 212 can include one or more databases the include information pertaining, for example, to the title of the news story (Minneapolis Star Tribune in Bankruptcy Filing 102), the location of where the story originated (New York 110), the news organization (Reuters Business News 112), and the date of the story (Monday Jan. 26, 2009 114). The structure and/or organization will generally be similar to and operationally compatible with the databases discussed in FIGS. 3A and 3B, and FIGS. 6A and 6B, as described herein.

Stored user preferences database 210 will contain information directly or indirectly supplied by the author, and thus contain manually entered preferences that enable the system 200 to understand the primary areas of interest to the author/user. For example, the author of news story 100 may have set his/her main area of interest as the newspaper industry, thus giving entities 106 having a known association in the newspaper industry a boost in the ranking, or order in which entities (e.g., entities 108a-c) are displayed, such as shown in FIG. 1.

In the case of FIG. 1, it is likely that disambiguation service 206 would list entity 108a first given the headline of the story Minneapolis Star Tribune in Bankruptcy Filing. However, if the disambiguation service 206 is unsure as to whether it is entity 108a, 108b or 108c that is the most likely candidate to correspond to entity 106, and thus present such entity as the first option 108a in the list of entities 108a, 108b and 108c, the user's main area of interest may be used to facilitate this decision by disambiguation service 206, and thus indicate to the logic used by disambiguation service 206 to display entity 108a first, as shown in FIG. 1. Since stored user preferences database 210 can also store indirect preferences, such as previously disambiguated entities by the user/author of text 104, ranking could also based on previous disambiguated entities 106 by the same author. Of course, in embodiments of the present invention, disambiguation service 206 can use both the specified user's main area of interest as stored in preferences database 210 in combination (e.g., a weighted combination), for example, with the recency and/or frequency of previously disambiguated entities 106 by the same author. In embodiments of the present invention, stored user preferences database 210 may also reside locally on computer 202.

Descriptive metadata is generally information describing the intellectual content of the object. For example, the well known MAchine-Readable Cataloging (MARC) standards consist of the MARC formats, which are standards for the representation and communication of bibliographic and related information in machine-readable form, and related documentation. Descriptive metadata may describe information that identifies resources that enable searching and retrieving at the web-level. For example, descriptive metadata may be used to facilitate searching the Web to find an image collection pertaining to major league baseball players, and/or enable users to discover resources pertaining to digitized collections of information pertaining to the Civil War. For example, if a search engine (e.g., Google; www.google.com) understands that "Babe Ruth" was a "baseball player," it can answer a search query on "famous baseball players" with a link to a web page about Babe Ruth, although the exact words "famous baseball players" never occur on that web page. This approach, called knowledge representation, is of particular interest to the semantic web.

Structural metadata is information that ties each object to others to make up logical units. For example, structural metadata may be used, for example, to describe relationships among materials (e.g., photograph B was included in manuscript A) and/or bind related files and scripts (e.g., File A is the JPEG format of the archival image File B). Structural metadata describes the architecture and relationships of the different sections of a resource for the purposes of navigation. Examples of structural metadata include, for example, the table of contents, page numbers, and index of a journal, or the types of reports (laboratory, imaging, consultant) for a patient encounter contained in a medical record.

Advantageously, in accordance with various embodiments of the present invention, the use of metadata in accordance with various embodiments of the present invention allows the use if linked data to expose, share, and connect data on the Web via dereferenceable Uniform Resource Identifiers (URI). The unique identifier (e.g., UI1, 302a in FIG. 3) that is stored within the document 100 as metadata can serve as the URI for the linked data concept.

Since for each entity, such as entities 108a, 108b, 108c shown in FIG. 3A, the system 200 knows the permanent and unique identifier 302a, 302b, 302c respectively associated with each entity 108a, 108b, 108c, the system 200 can access entities based on this the unique identifier stored in the UniqueID field 302. It should be understood that the content of database 300 can include additional fields that contain additional information. Illustrative and exemplary data fields that could also be added to entity database 300 include, for example, individual compensation information, individual age, current stock price, current stock price/earnings ratio, number of employees, gross revenue, net profits (or loss), etc.

In one embodiment of the present invention, database 300 can be created by users who create or otherwise utilize documents 100. Certain users may have read only privileges, allowing them to only access the database and utilize it, for example, in the manner described in connection with FIGS. 1, 4 and 5. Other users may have use and edit rights. For example, certain users may be given the right to edit transient data associated with an entity. Thus, for example, if one user knows that entity 302a shown in FIG. 3A changes companies (corresponding to field Company 306) from Morton Fraser Solicitors to General Electric, such user may be able to update the database 300 to indicate this fact. Similarly, the user may be given the right to add a new field (not shown) called Current Company, and enter General Electric in the Current Company field. Such user may also, for example, be given the right to change the name of field 306 from Company to Previous Company.

Further, other users may also be given the right to add entities to the database 300, and populate database 300 with data. For example, certain users may be able to add a new entity to database 300, and populate database field 316, 318, 306, 308, 314, 304, 312 and/or 310 with salient information. When a user is given rights to add entities to database 300, the system 200 (e.g., computer 900 shown in FIG. 9) will generally assign each Unique ID associated with field 302 each time an entity is added to the database 300 to ensure the entity identifiers remain unique.

In one embodiment of the invention, therefore, it is preferred that users be prohibited from editing or changing any entries (or portion thereof) in the Unique ID field 302, and that the system assign such Unique ID's when the user requests that en entity be added to the database 300. When a user requests that a new entity be added to the database, the system 200 will provide the user with one or more appropriate data entry screens (not shown) to accomplish this task.

FIG. 3B, generally at 350, is an exemplary illustration of a structure and/or organization of an entity database, or portion thereof. The database shown in FIG. 3B pertains to cities and, accordingly, has field names pertaining to cities. In particular, in addition to UniqueID field 302, database 350 shows field names pertaining to CityName 316, State 318, Country 320, Latitude 322 and Longitude 324. As is the case with the database shown in FIG. 3A, it should be understood that the content of database 350 can include additional fields that contain additional information. Illustrative and exemplary data fields pertaining to cities that could also be added to entity database 350 include, for example, population, average income, average temperature, etc. Generally, the database 350 shown in FIG. 3B shares the same characteristics and salient operating features as the database 300 shown and described above in connection with FIG. 3A. Entity database 350 will generally contains large numbers of entities 326 (e.g., tens of thousands). As shown in FIG. 3B, entity 326 has, in the unique ID IU994ec1bf, associated with it, as shown in UniqueID field 302.

Figure 4:
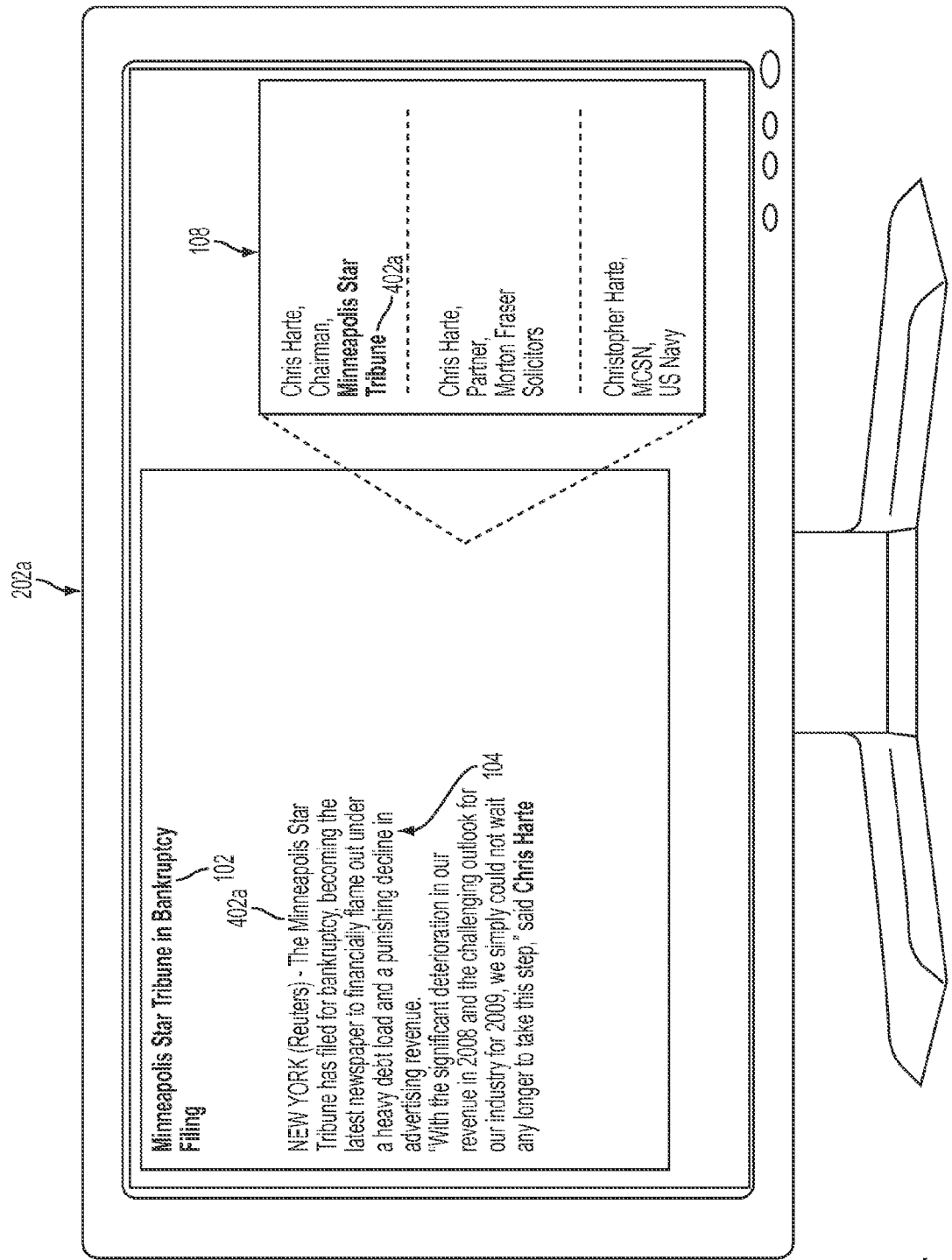
FIG. 4 is an exemplary document, as shown in FIG. 1, showing a pop up menu that allows a user to select additional information about one or more entities presented to a user, in accordance with various embodiments of the present invention.

FIG. 4 is an exemplary document, as shown in FIG. 1, that allows a user to select additional information about one or more entities presented to a user in a pop up menu 108, in accordance with various embodiments of the present invention. More particularly, the user could select, for example, by double clicking with a mouse (e.g., mouse 942 in FIG. 9), the Minneapolis Star Tribune 402a in menu 108. Similarly, the system 200 could display the Minneapolis Star Tribune 402a as an entity from text 104. In either case, data pertaining to the Minneapolis Star Tribune could appear as shown in FIG. 5.

Figure 5:
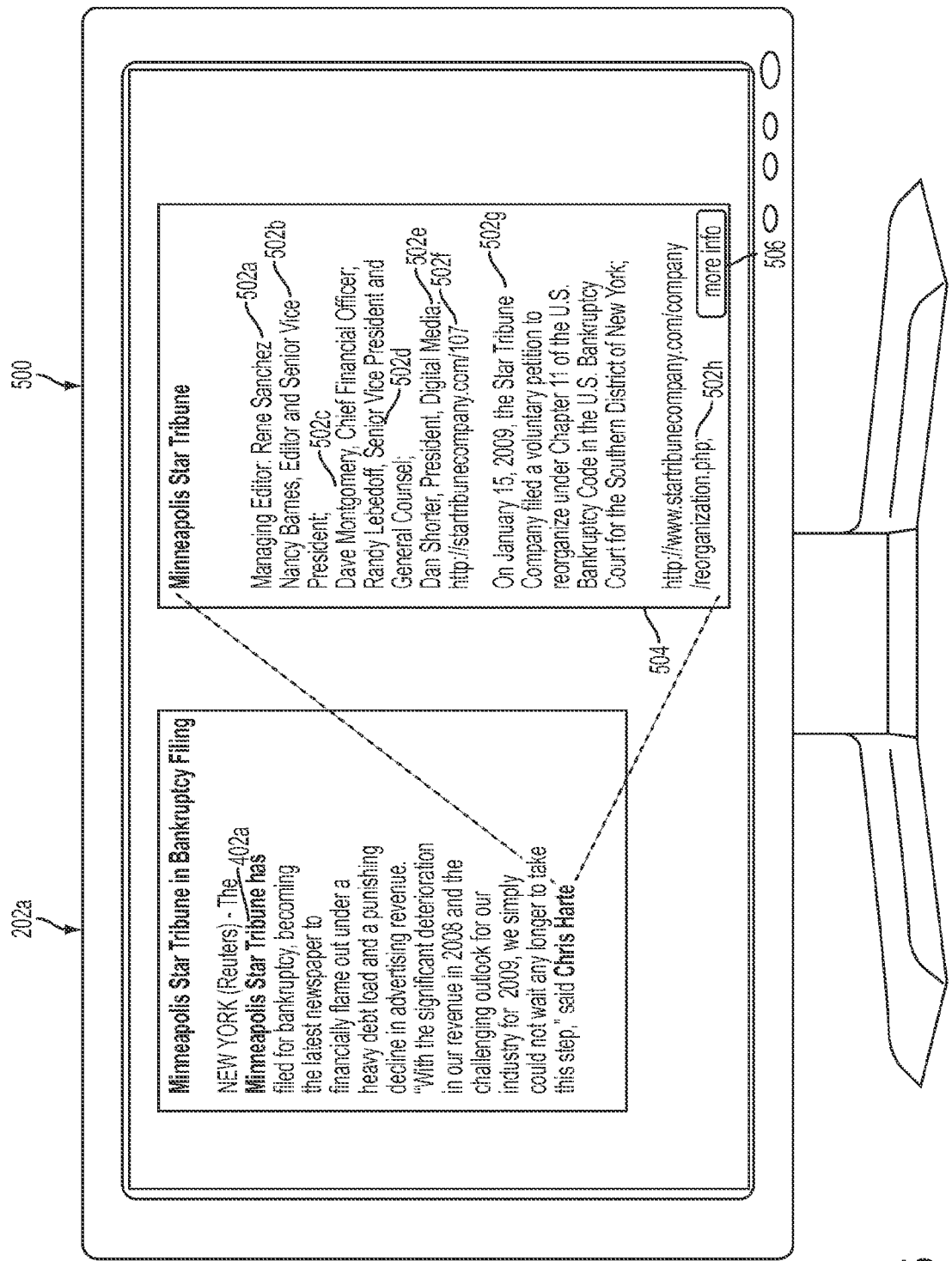
FIG. 5 is an exemplary illustration of metadata that can be obtained as a result of such metadata being associated with an entity in a particular document, in accordance with various embodiments of the present invention.

More particularly, FIG. 5, generally at 500, is an exemplary illustration of additional data 502a-h that can be obtained as a result of such data being associated with an entity, such as entity Minneapolis Star Tribune 402a, in a particular document, in accordance with various embodiments of the present invention. When a user selects the Minneapolis Star Tribune 402a shown in FIG. 4, another menu 504 can appear as shown in FIG. 5. Thus, if a user wants to ascertain or investigate further information about the Minneapolis Star Tribune 402a by clicking on the Minneapolis Star Tribune 402a entity shown in FIG. 4, additional information pertaining to the Minneapolis Star Tribune 402a appears in menu 504. More particularly, menu 504 displays information pertaining to: i) Managing Editor: Rene Sanchez, 502a; ii) Nancy Barnes, Editor and Senior Vice President, 502b; iii) Dave Montgomery, Chief Financial Officer, 502c; iv) Randy Lebedoff, Senior Vice President and General Counsel, 502d; v) Dan Shorter, President, Digital Media, 502e; vi) a link http://startribunecompany.com/107 (502f), providing additional information about Minneapolis Star Tribune management; vii) information pertaining to the Minneapolis Start Tribune's Chapter 11 bankruptcy filing 502g; and viii) a link http://www.startribunecompany.com/company/reorganization.php (502h), providing additional information about Minneapolis Star Tribune bankruptcy. Any or all of this data can advantageously be incorporated into the text 104 of FIG. 1.

FIG. 6A, generally at 600, is a second exemplary illustration of a structure of an entity database or portion thereof. As shown, FIG. 6 includes entity 402a, Minneapolis Star Tribune. However, as previously noted, entity database 208 will generally contains large numbers of entities 106 (e.g., typically in the millions, tens of millions, or even more). As shown in FIG. 6A, entity 402a has the unique ID UI4 associated with it, as shown in UniqueID field 302.

FIG. 6A may be an illustration of a database 600 having a structure that is relevant or keyed to user preferences. Thus, if the particular user has set his/her preferences as having a main area of interest pertaining to the newspaper industry, fields such as Publisher and Chairman 602, Managing Editor 604, Management 606, and/or Recent Events 608 may be utilized. These fields may be respectively populated with data items 612 (associated with Publisher and Chairman 602), 502a and 502i (associated with Managing Editor 604), 502b-f (associated with Management 606), and 502g and 502h (associated with Recent Events 608). Generally, database 600 shown in FIG. 6A shares the same characteristics and salient operating features as database 300 shown and described above in connection with FIGS. 3A and 3B. Unique ID UI4 is associated with the Minneapolis Start Tribune, as shown at 610.

Figure 6B:
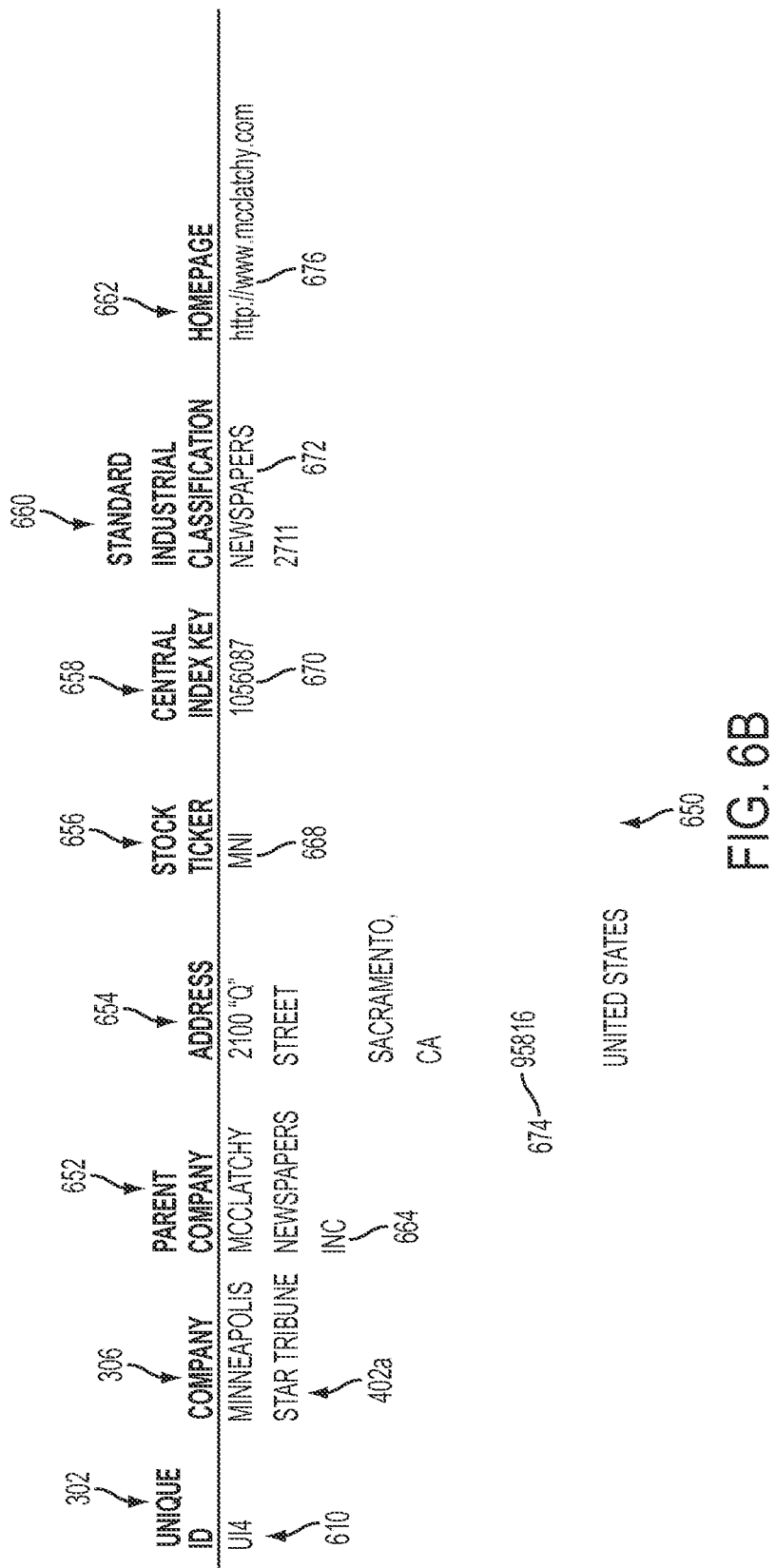

FIG. 6B, generally at 650, shows an example of a database structure or organization that may be related to or an extension of database 600 shown in FIG. 3A. As shown, database 650 includes the fields of UniqueID 302, Company 306, Parent Company 652, Address 654, Stock Ticker 656, Central Index Key 658, Standard Industrial Classification 660, and Homepage 662. The contents of database 650 can be displayed on display monitor 202a in a same or similar manner as shown in FIG. 6A, for example, when the user activates (e.g., by using a mouse) the More Info icon 506. These fields may be respectively populated with data items UI4 610 (associated with UniqueID 302), 664 (associated with Parent Company 652), 674 (associated with Address 654), 668 (associated with Stock Ticker 656), 670 (associated with Central Key Index 658), 672 (associated with Standard Industrial Classification 660), and 676 (associated with Homepage 662).

The Central Index Key (CIK) 658 is used on the Security Exchange Commission's (SEC) computer systems to identify corporations and individual people who have filed disclosure with the SEC. The Standard Industrial Classification (SIC) 660 is a United States government system for classifying industries by a four-digit code.

FIGS. 7A and 7B, taken together, is exemplary eXtensible Markup Language (XML) code associated with the text 104 shown in FIG. 1. XML is a general-purpose specification for creating custom markup languages, allowing the user to define the mark-up elements. XML facilitates the ability of computer and other information systems to share structured data, especially via the Internet.

XML utilizes start tags, shown as < >, and end-tags, shown as </>. An XML element is everything from (including) the element's start tag to (including) the element's end tag. As shown in FIG. 7A, the elements <TYPE> 702a and </TYPE> 702b have text content, because they include the text of Daily News—Press Releases. Tags may also be associated with the text in a document 100. For example, tags <SOURCE> 704a and </SOURCE> 704b include the text Reuters Business News, which appears as Reuters Business News 112 text in document 100, as shown in FIG. 1. Tags <Title> 706a and <Title> 706b, <DATE> 708a and </DATE> 708b, and <BODY> 710a and </BODY> 710b also include respective text 102 (Minneapolis Star Tribune in Bankruptcy Filing), 114 (Jan. 26, 2009) and 106 (corresponding to the body of the document 100 text 104).

The XML code may also include a tag of <item type="Person">, as shown at 712, generally indicating that the entity associated with the unique identifier associated with the tag is a person. Tags <uid> 714a and </uid> 714b include Ulf, which corresponds to UI1 302a, in the Unique ID field 302, as shown in FIG. 3.

As also shown in FIG. 7A, the <Surname> 718a, <GivenName> 720a, <Company> 722a, <Position> 724a, <Nationality> 726a, <Gender> 728a, <Affiliation> 730a, and <Education> 732a tags are respectively associated with the same-named fields 316, 318, 308, 314, 304, 312 and 312, as shown in FIG. 3A. It should be understood that the text content of tags 720a/720b, 722a/722b, 724a/724b, 726a/726b, 728a/728b 720a/730b and 732a/732b do not necessarily have to correspond to the names of the respective fields 318, 306, 308, 314, 304, 312 and 310 as shown in FIG. 3A, but are shown in this manner as for consistency and convenience. Implementations of the present invention do not require that the text content within XML tags match that of the field names used in connection with data repositories.

FIG. 7B generally shares many of the same characteristics of, and is indeed is part of the same XML document as FIG. 7A. For example, entity item types of City and Company are respectively shown at 726, 728. In addition, it is apparent that certain tags (e.g., 730a/730b) shown in FIG. 7B correspond to or are associated with the fields in database 300 (e.g., Company 306). However, as noted above, implementations of the present invention do not require that the text content within XML tags match that of the field names used in connection with data repositories. Accordingly, it can be seen that the <CIK> tag 732a and </CIK> tag 732b correspond to the Central Index Key 658 field in FIG. 6B. As also shown, the text content 1056087 between tags 732a and 732b corresponds to the data 1056087, shown as item 657 within the Central Index Key field 658 in FIG. 6B.

Figure 8:
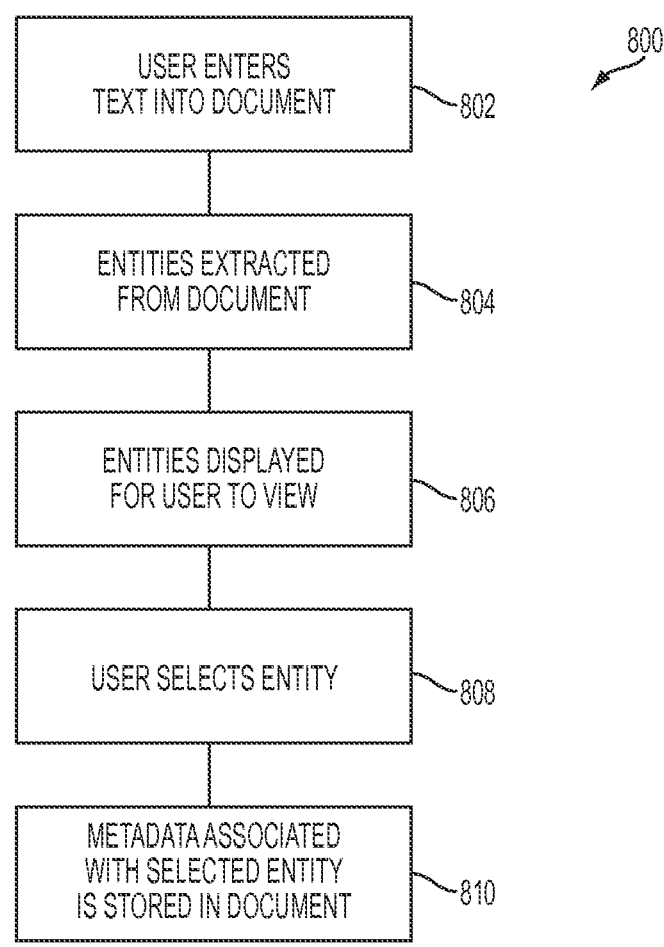
FIG. 8 is an exemplary flow diagram, illustrating aspects of the process of disambiguating entities within a document from, an end user perspective.

FIG. 8, generally at 800, is an exemplary flow diagram, illustrating aspects of the process of disambiguating entities with a document from an end user perspective. At step 802, an end user types content in an editing tool, such as standard word processing software or a text editor, to create an electronic document. At step 804, an entity extractor (running, for example, on computer 204 as described above) searches for entities people, companies, organizations, places/geographic locations, events, books, albums, authors and the like. Typically, the entity extractor will extract entities from a document 100 as a user types and enters text.

At step 806, when the entity extraction software detects an entity, such as Chris Harte 106, the names of potential candidates corresponding to Christ Harte 106 are returned to and displayed for the end user to view. The ranking or ordering of the names presented can be provided to the user, for example, by taking user preferences and/or other entities in the document into account. In addition, previous articles and/or other text entered by the author can also be considered and utilized in presenting the ranking or ordering of the names presented to the end user.

At step 808, the user selects one of the instances of the entities presented. For example, in FIG. 1, the user would select Chris Harte, Chairman, Minneapolis Star Tribune 108a, insofar as the title 102 and text 104 of the news article pertain to the Minneapolis Star Tribune.

At step 810, once the user selects Chris Harte, Chairman, Minneapolis Star Tribune 108a, a unique identifier will be associated with and stored within the document 100 as an additional metadata item in connection with the entity/individual Chris Harte 108a.

FIG. 9, generally at 900, shows an exemplary standard general-purpose computing device 202b that can be used to implement embodiments of the present invention. FIG. 9 is substantially similar to FIG. 1 of U.S. Pat. No. 7,003,522, issued on Feb. 21, 2006, and FIG. 1 of U.S. Pat. No. 7,032, 174, issued on Apr. 18, 2006. U.S. Pat. No. 7,003,522 and U.S. Pat. No. 7,032,174 are both incorporated herein by reference in their entirety.

Computing device 202b includes a processing unit 921, memory 922, and bus 923 that couples various system components including memory 922 to processing unit 921. The bus 923 may be any of several types of bus structures including a memory bus or memory controller, a peripheral bus and a local bus using any of a variety of bus architectures.

Memory 922 includes read-only memory (ROM) 924 and random access memory (RAM) 925. A basic input/output system (BIOS) 926, containing one or more basic routines that help transfer information between elements within the computing device 202b, such as during start-up, is stored in ROM 924. Computing device 202b further includes a hard disk drive 927 for reading from and writing to a hard disk, a magnetic disk drive 928 for reading from or writing to a removable magnetic disk 929, and an optical disk drive 930 for reading from or writing to a removable optical disk 931 such as a CD ROM or other optical media. The hard disk drive 927, magnetic disk drive 928 and optical disk drive 930 are connected to system bus 923 by a hard disk drive interface 932, magnetic disk drive interface 933 and optical drive interface 934, respectively. The drives and their associated computer-readable media provide nonvolatile storage of computer-readable instructions, data structures, program modules and other data for the computing device 202b. Although the exemplary environment described herein employs a hard disk, a removable magnetic disk 929 and a removable optical disk 931, it should be appreciated by those skilled in the art that other types of computer-readable media which can store data that is accessible by a computer, such as magnetic cassettes, flash memory cards, digital versatile disks, Bernoulli cartridges, random access memories (RAMs), read-only memories (ROMs) and the like, may also be used in the exemplary operating environment.

A number of program modules may be stored on the hard disk, magnetic disk 929, optical disk 931, ROM 924 or RAM 925, including an operating system 935, one or more application programs 936, other program modules 937 and program data 938. A user may enter commands and information into the computing device 202b through input devices such as a keyboard 202c and pointing device 942. Other input devices (not shown) may include a microphone, joystick, game pad, satellite dish, scanner, or the like. These and other input devices are often connected to the processing unit 921 through a serial port interface 946 that is coupled to the system bus 923, but may be connected by other interfaces, such as a parallel port, game port or a universal serial bus (USB).

A monitor 202a or other type of display device is also connected to the system bus 923 via an interface, such as a video adapter 948. One or more speakers 957 are also connected to the system bus 923 via an interface, such as an audio adapter 956. In addition to the monitor and speakers, computing devices typically include other peripheral output devices (not shown), such as printers.

The computing device 202b may operate in a networked environment using logical connections to one or more remote computers, such as one or more remote computers 949. Each remote computer 949 may be another computing device, such as computing device 202b. Remote computer(s) 949 may also be or include, for example, one or more servers, routers, networked personal computers, peer devices and/or other standard network nodes. A memory storage device 950 is also shown. The logical connections depicted in FIG. 9 include local area network (LAN) 951 and wide area network (WAN) 952. As depicted in FIG. 9, remote computer 949 communicates with computing device 202b via the local area network 951. Remote computer 949 can also communicate with computing device 202b via wide area network 652.

When used in a LAN networking environment, computing device 202b is connected to local network 951 through a network interface or adapter 953. When used in a WAN networking environment, computing device 202b typically includes modem 954 or other means for establishing communications over wide area network 952, such as the Internet. Modem 954, which may be internal or external, is connected to bus 923 via serial port interface 946. In a networked environment, program modules depicted relative to computing device 202b (or portions thereof) may be stored in the remote memory storage device. It will be appreciated that the network connections shown are exemplary and other means of establishing a communications link between the computers may be used.

Thus, in accordance with various embodiments of the present invention, an author, editor, journalist, and the like, can positively choose and confirm that a known entity stored in a data repository is associated with an entity in a document that the author is creating (or has created). In addition, a news story can be enriched with additional information, as described above in connection with FIGS. 6A and 6B. If the Interactive Disambiguation Service (IDS) capability in accordance with various embodiments of the present invention is offered to outside external journalists and/or authors, this service can be advantageously offered as a premium service at extra cost.

From the description set forth above, it should also be apparent that another benefits of the IDS system is the ability to create news stories, articles, and the like, more accurately, in a consistent manner, and much faster, since journalists and/or authors will no longer need to perform research pertaining to various entities to assure that they are utilizing and/or referring to the correct information within a news story.

The structures shown and discussed in embodiments of the invention are exemplary only and the functions performed by these structures may be performed by any number of structures. For example, certain functions may be performed by a single physical unit, or may be allocated across any number of different physical units. All such possible variations are within the scope and spirit of embodiments of the invention and the appended claims.

Embodiments of the present invention have been described for the purpose of illustration. Persons skilled in the art will recognize from this description that the described embodiments are not limiting, and may be practiced with modifications and alterations limited only by the spirit and scope of the appended claims which are intended to cover such modifications and alterations, so as to afford broad protection to the various embodiments of invention and their equivalents.

Having thus described our invention, what we claim as new and desire to secure by Letters Patent is as follows:

1. A non-transitory computer program product residing on a non-transitory computer readable medium for storing computer instructions therein for enabling a computer to perform a computer-implemented and user assisted process for disambiguating entities in an electronic document, the non-transitory computer program product comprising instructions for enabling a computer and a user to:
   (a) create, by the user, an electronic document by using a text editing software program to enter a plurality of terms;
   (b) present, by the computer to the user as the user is entering the plurality of terms in the electronic document, for a particular term entered by the user in the electronic document, a list of entities, wherein each entity on the list corresponds to a different instance of the particular term, wherein each entity on the list has a unique semantic interpretation of the particular term, and wherein each entity on the list does not appear on the list more than one time;
   (c) rank, by the computer, each entity in the list of entities, wherein the ranking is based on
      (i) the plurality of terms in the electronic document; (ii) one or more entities previously selected by the user in the electronic document and how recently those one or more entities were selected by the user; (iii) saved preferences of the user; (iv) terms in previous electronic documents created by the user; and (v) one or more entities previously selected in electronic documents created by the user;
   (d) select from the list, by the user, an entity provided in the computer provided list;
   (e) include in the electronic document, in response to the selection by the user, an identifier corresponding to the entity selected from the list by the user, wherein the identifier comprises a link to additional information about the entity; and
   (f) store the entity selected by the user in both a first entity database that contains entities selected by the user and a second entity database that contains entities that have been selected by all users.

2. The computer program product according to claim 1, further comprising incorporating metadata associated with the user-selected entity into the electronic document.

3. The computer program product of claim 1, wherein the list comprises at least one person.

4. The computer program product of claim 1, wherein the list comprises at least one geographic location.

5. The computer program product of claim 1, wherein the list comprises at least one commercial enterprise.

6. The computer program product of claim 1, further comprising instructions for enabling the user to add a new entity to the first entity database and the second entity database.

7. The computer program product of claim 6, further comprising instructions that allow the user to add to the first entity database and the second entity database additional data associated with a particular entity.

8. The computer program product of claim 7, further comprising instructions for assigning a unique identifier to each entity stored in the first entity database and the second entity database.

9. A computer, comprising:
   (a) a memory; and
   (b) a program resident in the memory and configured to facilitate disambiguation of entities within a user-created electronic document in which the user has entered a plurality of terms by
      (i) presenting to a user as the user is entering the plurality of terms in the electronic document, for a particular term entered by the user in the electronic document, a list of entities, wherein each entity on the list corresponds to a different instance of the particular term, wherein each entity on the list has a unique semantic interpretation of the particular term, and wherein each entity on the list does not appear on the list more than one time,
      (ii) ranking each entity in the list of entities, wherein the ranking is based on (1) the plurality of terms in the electronic document; (2) one or more entities previously selected by the user in the electronic document and how recently those one or more entities were selected by the user; (3) saved preferences of the user; (4) terms in previous electronic documents created by the user; and (5) one or more entities previously selected in electronic documents created by the user;
      (iii) enabling the user to select one of the entities from the list;
      (iv) receiving a selection of one of the entities from the list by the user, and including in the electronic document an identifier corresponding to the entity selected by the user, wherein the identifier comprises a link to additional information about the entity; and
      (v) storing the entity selected by the user in both a first entity database that contains entities selected by the user and a second entity database that contains entities that have been selected by all users.

10. The computer according to claim 9, wherein the program is configured to incorporate metadata pertaining to the user-selected entity into the electronic document.

11. The computer according to claim 9, wherein the program enables the user to add a new entity to the first entity database and the second entity database.

12. The computer according to claim 11, wherein the program enables the user to add to the first entity database and the second entity database additional data associated with a particular entity.

13. The computer according to claim 12, wherein the program assigns a unique identifier to each entity stored in the first entity database and the second entity database.

14. A system for facilitating the disambiguation of entities in an electronic document, comprising:

one or more input devices;
one or more output devices; and
a computer comprising at least one of a memory and a storage medium, for storing a program that facilitates the disambiguation of entities in the electronic document, wherein the program:
  (i) receives data from the at least one input device, including a plurality of terms entered by a user in the electronic document,
  (ii) provides to the at least one output device, while receiving the plurality of terms entered by the user in the electronic document, a list of entities corresponding to a particular term received via the at least one input device, wherein each entity on the list corresponds to a different instance of the particular term, wherein each entity on the list has a unique semantic interpretation of the particular term, and wherein each entity on the list does not appear on the list more than one time,
  (iii) ranks each entity in the list of entities, wherein the ranking is based on (1) the plurality of terms in the electronic document; (2) one or more entities previously selected by the user in the electronic document and how recently those one or more entities were selected by the user; (3) saved preferences of the user; (4) terms in previous electronic documents created by the user; and (5) one or more entities previously selected in electronic documents created by the user;
  (iv) receives via the at least one input device a selection, by a user, of one of the entities from the list of entities;
  (v) includes in the electronic document, in response to the selection by the user, an identifier corresponding to the entity selected from the list of entities by the user, wherein the identifier comprises a link to additional information about the entity; and
  (vi) stores the entity selected by the user in both a first entity database that contains entities selected by the user and a second entity database that contains entities that have been selected by all users.

15. The system according to claim 14, wherein the program enables the user to add a new entity or additional data associated with an existing entity to the first entity database and the second entity database.

16. The system according to claim 14, wherein metadata pertaining to the selected entity is stored in the electronic document.

\* \* \* \* \*